United States Patent [19]

Hyon et al.

[11] Patent Number: 4,966,924
[45] Date of Patent: Oct. 30, 1990

[54] SOFT CONTACT LENS AND METHOD OF MANUFACTURING THE SAME

[75] Inventors: Suong-Hyu Hyon; Yoshito Ikada, both of Uji, Japan

[73] Assignee: Biomaterials Universe, Inc., Kyoto, Japan

[21] Appl. No.: 351,348

[22] Filed: May 15, 1989

Related U.S. Application Data

[62] Division of Ser. No. 117,171, Sep. 30, 1987.

[30] Foreign Application Priority Data

Feb. 13, 1986 [JP] Japan .................................. 61-29189

[51] Int. Cl.$^5$ ................................................ C08J 0/00
[52] U.S. Cl. ..................... 523/106; 524/557; 525/61
[58] Field of Search ............ 524/557; 525/61; 523/106

[56] References Cited

U.S. PATENT DOCUMENTS

| | | | |
|---|---|---|---|
| 4,426,492 | 1/1984 | Steckler | 525/61 |
| 4,472,542 | 9/1984 | Nambu | 524/557 |
| 4,559,186 | 12/1985 | Lee | 525/61 X |
| 4,619,793 | 10/1986 | Lee | 523/106 |

FOREIGN PATENT DOCUMENTS

| | | | |
|---|---|---|---|
| 0093992 | 8/1976 | Japan | 524/557 |
| 0036538 | 4/1981 | Japan | 525/56 |

*Primary Examiner*—Joseph L. Schofer
*Assistant Examiner*—J. M. Reddick
*Attorney, Agent, or Firm*—Armstrong, Nikaido, Marmelstein, Kubovcik & Murray

[57] ABSTRACT

A soft contact lens of PVA having a tensile strength of not less than 10 kg/cm$^2$, a water content ranging from 40 to 95% by weight, a visible light transparency of not less than 90%, and an oxygen permeability of not less than $30 \times 10^{-11}$ cm$^3 \cdot$(STP)$\cdot$cm/cm$^2\cdot$sec$\cdot$mmHg. This soft contact lens can be prepared by forming a solution of PVA in a mixed solvent of water and an organic solvent, pouring the PVA solution in a mold having a shape of contact lens, and crystallizing at a temperature of not more than ordinary temperature. The soft contact lens has a high mechanical strength, high water content, high transparency and high oxygen permeability.

4 Claims, No Drawings

SOFT CONTACT LENS AND METHOD OF MANUFACTURING THE SAME

TECHNICAL FIELD

The present invention relates to a soft contact lens comprising a poly(vinyl alcohol) (PVA) of high mechanical strength, high water content, excellent transparency, and high oxygen permeability, and a method of manufacturing the same.

BACKGROUND OF THE INVENTION

There are two kinds of contact lenses, soft and hard. The material for the hard contact lens(HCL) is a synthetic resin with network structure containing poly(methyl methacrylate)(PMMA) as a main component and a crosslinking agent. This polymer is widely used in clinical field for HCL because the transparency, the molding processability, the biostability, and the durability are excellent, but this HCL is not suitable for extended wear because the oxygen permeability is not high enough for the respiratory metabolism of the eyeballs and the hard nature of the material gives a feeling of foreign body to the patient.

Materials widely used for the soft contact lens(SCL) in clinical field include a silicone elastomer and a copolymer of butyl acrylate(BA) and butyl methacrylate(BMA) as hydrophobic ones and poly(hydroxyethyl methacrylate)(PHEMA) and a copolymer of methyl methacrylate(MMA) and vinyl pyrrolidone(VP) as hydrophilic ones. These materials are superior to those of the HCL in oxygen permeability. However, the hydrophobic materials have disadvantages such as poor wear feeling caused by lower water wettability, remarkable adsorption of lipids, and surface damage due to high electrostatic charging, while the hydrophilic ones are very high in production cost, strongly adsorbed with proteins, and very low in mechanical strength, although they give excellent wear feeling and minimum damage to cornea.

The PVA hydrogels have already been proposed as materials for SCL, for instance PVA gels crosslinked with glyoxal (U.S. Pat. No. 3,408,429) and PVA contact lens crosslinked with borates (Japanese Unexamined Patent Publication (Tokkyo Kokai) No. 75111/1983). However, these may stimulate the patient cornea through unreacted compounds remaining in the gel or degradation products with the lapse of time, since these gels are chemically crosslinked with glyoxal and borates. On the other hand, a PVA contact lens is proposed which is prepared through annealing (Japanese Unexamined Patent Publication (Tokkyo Kokai) No. 214128/1982), but this is not sufficient in water content and mechanical strength and needs a complicated and long fabrication process.

As a result of the present inventors' intensive study for solving the defects of the conventional PVA hydrogel SCL, and for developing a simple and inexpensive method of production of SCL which is improved in mechanical strength and has a high water content, an SCL of a high strength, water content and oxygen permeability fabricated in a simple and inexpensive method can be obtained by dissolving PVA in a mixed solvent consisting of water and an organic solvent, followed by crystallizing the PVA between its molecular chains at a temperature of not more than ordinary temperature.

DISCLOSURE OF THE INVENTION

The present invention relates to a soft contact lens of PVA which has a tensile strength of not less than 10 kg/cm$^2$, a water content ranging from 40 to 95% by weight, a visible light transparency of not less than 90 %, and an oxygen permeability of not less than than $30\times10^{11}$cm$^3$ (STP)·cm/cm$^2$sec·mmHg. The PVA soft contact lens having excellent strength, water content and oxygen permeability can be obtained by dissolving PVA in a mixed solvent consisting of water and an organic solvent, followed by pouring the PVA solution into a convex and concave mold substantially corresponding to the contact lens shape and subsequent crystallization of PVA at a temperature of not more than ordinary temperature.

The PVA soft contact lens of the invention is excellent in transparency and oxygen permeability as well as in mechanical strength and water content. The reason for formation of such a PVA soft contact lens with a high water content and strength is seemed in the following. The solution obtained by dissolving PVA in the mixed solvent consisting of water and an organic solvent is likely to be molecularly homogeneous. As the temperature of the homogenous solution is lowered, the molecular motion must become restricted to some extent and localized regions of high segment density are produced in solution. Cooling below ordinary temperature that lead to secondary bond formation between the molecular chains may be promoted to yield small crystalline nuclei, and the crystallization may proceed with the lapse of time. The resulting micro-crystallities should act as strong crosslinks of a three-dimensional network structure, and can provide a PVA soft contact lens of high mechanical strength, high water content and also high transparency.

PREFERRED EMBODIMENTS

The degree of specification to be used in the present invention should be not less than 95 % by mole, preferably not less than 97 % by mole and especially not not more than 99 % by mole. If a degree of saponification, for instance, of not more than 85 % by mole, the gels obtained therefrom exhibit no high mechanical strength. The viscosity-average degree of polymerization of PVA should be not less than 1,000, preferably not less than 1,700. The commercially available PVA with degrees of polymerization ranging from 1,700 to 2,000 is recommended, as the gel strength becomes lower with the decreasing degree of polymerization of PVA. If a gel having higher strength, higher water content or higher resistance against hot water is desired, however, it is preferable to use PVA with high degrees of polymerization ranging from 3,000 to 10,000 or PVA rich in syndiotactic or isotactic structure. It is also preferable to use a fractionated PVA free of a low molecular weight fraction in order to prevent elution of PVA molecular.

The organic solvent used in the invention should be compatible with water and miscible with water at any mixing ratio. The preferable organic solvent includes acetone, methyl alcohol, n-propyl alcohol, isopropyl alcohol, aminoethyl alcohol, phenol, tetrahydrofuran, diemthyl formamide, glycerine, ethylene glycol, propylene glycol, triethylene glycol, and dimethyl sulfoxide (DMSO). Of these organic solvents, DMSO is the most preferable because of its high solubility for PVA and a desirable dependence of the freezing point depression on the mixing ratio of water. Though the mixing ratio of water to these organic solvents may be optionally selected, the mixing ratio of water to the solvents largely governs the mechanical strength as well as the transparency of the resulting PVA gel. The mixing ratio should be carefully chosen according to the purpose of the gel, and the water organic solvent ratio generally ranges from 90:10 to 10:90 (by weight), preferably from: 70:30 to 10:90. A gel can be produced even from a 100 % DMSO solution of PVA, but becomes translucent after exchange of dimethyl sulfoxide with water, although the gel before solvent exchange is transparent.

In accordance with the invention, a PVA solution is first prepared at a PVA concentration from 2 to 30 % by weight. The concentration is determined according to the required water content and mechanical properties of the gel. Such highly concentrated solutions can be readily prepared in general by raising the temperature of the PVA or it may be prepared by heating under stirring or with the use of autoclave or high-frequency heater.

Following casting the completely dissolved solution of PVA into a convex and concave mold corresponding to the contact lens shape, the solution is allowed to stand at a temperature of not higher than ordinary (room) temperature. During this process the PVA molecules undergo crystallization, resulting in formation of SCL. The lower the temperature, the shorter the time period required for complete crystallization is. It is recommended to cool the solution in a freezer kept at a temperature of not higher than $-10°$ C., preferably at about $-20°$ C. After the completion of crystallization, the gel is immersed for a long time in water under flowing to remove the organic solvent. Thorough exchange of the organic solvent in the gel with water finally yields an SCL of a high water content. The SCL can be also obtained by drying the gel to completion for removal of the organic solvent after the crystallization, followed by immersing the dried gel again in water for hydration. In this case, the gel drying can be carried out simply in the open atmosphere, but would be completed in a shorter time period if vacuum drying is additionally employed.

During the drying process, a slight increase of crystallinity will accompany the drying, leading to enhancement of its mechanical strengths and light transparency. Annealing after drying will result in a further increase of crystallinity.

Moreover, irradiation of the gel with radiations such as electron beams and gamma rays under reduced pressure, in an inert gas such as nitrogen or argon, or in water can be carried out in order to sterilize the PVA soft contact lens having a high strength, high water content and high oxygen permeability or to improve the mechanical properties, the thermal resistance, and the dimensional stability. Chemical crosslinking agents such as glutaraldehyde, boric acid and borax also may be employed for crosslinking of the PVA gel.

In the soft contact lens of the invention the microcrystals of PVA forms crosslinks of the three-dimensional network, and small pores are uniformly formed. Most of the pores are long and slender and the pore size is not more than 3 $\mu$m as scanning electron microscopic observation of samples obtained upon drying at critical point reveals. Homogeneous and dense distribution of small pores may result in an improvement of transparency.

The soft contact lens of the invention can be stained with appropriate dyes or pigments for a cosmetic purpose or to cut off ultraviolet rays.

The PVA soft contact lens having a high strength, high water content and high oxygen permeability of the present invention is explained by means of the following Examples. It is to be understood that the present invention is not limited to the Examples.

EXAMPLE 1

To a PVA (degree of saponification of 99.5 % by mole, viscosity-average degree of polymerization of 1,700, available from Unitika Ltd.) the mixed solvents described in Table 1 were added so as to have such PVA concentrations as described in the same Table. PVA solutions were obtained upon heating the mixture for 2 hrs in an autoclave kept at 110° C. Following cooling the PVA solutions to a temperature range of 50°–80° C., they were poured into a mold. One of the surface was approximately spherical and convex (curvature radius of the central part $(R_1) \propto 6.0$ mm), while the other surface of the mold had an interference spherical (with a projection at the peripheral part) and was concave (curvature radius of the central part $(R_2) \propto 6.0$ mm, internal diameter $(S) \propto 12$ mm). The distance between the central parts of the convex and concave surfaces was 0.3 mm. The mold was prepared from a tetrafluoroethylene-hexafluoropropylene copolymer with a cut shaving and polishing method. The PVA solution in the mold was allowed to stand for 1 hr in a freezer kept at $-20°$ C. The resulting PVA gel was taken out from the mold and the organic solvents in the gel were exchanged with water by immersing the gel in plenty of water (40°–60° C.) to give a PVA soft contact lens.

TABLE 1

| Experimental No. | Mixed Solvent Composition | Mixing Ratio (by weight) | PVA Concentration (% by weight) |
|---|---|---|---|
| 1 | H$_2$O: DMSO | 2:8 | 10 |
| 2 | " | 2:8 | 15 |
| 3 | H$_2$O: Ethylene glycol | 4:6 | 10 |
| 4 | H$_2$O: Ethylene glycol | 4:6 | 15 |
| 5 | H$_2$O: Glycerine | 5:5 | 10 |
| 6 | " | 5:5 | 15 |
| 7 | H$_2$O: Ethylene glycol | 8:2 | 10 |
| 8 | H$_2$O: Ethylene glycol | 8:2 | 15 |
| Comparative Experimental No. | | | |
| 1 | Water | 100 | 15 |
| 2 | DMSO | 100 | 15 |
| 3 | PHEMA* | 100 | — |

*Poly(2-hydroxyethyl methacrylate) crosslinked with ethylene glycol dimethacrylate Each soft contact lens thus prepared was measured to determine strength, elongation at break, water content, visible light transmittance, and oxygen permeability according to the following measurement conditions.

The results are shown in Table 2.

Tensile strength and elongation at break

Measured at a tensile speed of 100 mm/min, 20° C., and relative humidity (RH) of 65 % by using Tensilon-/UTM-4-100 of Kabushiki Kaisha Toyo Boldwin.

Water content

The soft contact lens with Experimental Nos. 1-8 and Comparative Experimental No. 2 were immersed in water at 20° C. for 3 days and then air-dried over day and night in a draft chamber. Following drying further under vacuum over day and night at room temperature to remove the organic solvent, they were put again in water at 37° C. for 2 days. The water content was calculated from the equation:

$$\text{Water content (\%)} = \frac{\text{Weight of hydrated } SCL - \text{Weight of dried } SCL}{\text{Weight of hydrated } SCL}$$

The products of Comparative Experiment Nos. 1 and 3 were measured in the same manner, though they did not contain an organic solvent.

Visible light transmittance

Transmittance of light at 550 nm was measured under immersion in water at 25° C. by using a multi-purpose self-registering spectrophotometer available from Shimadzu Corporation.

Oxygen permeability

Oxygen permeability was measured at 35° C. by using a Gas Permeation Apparatus for Polymer Films EM-05OSF available from ESCO Denshi-Kagaku Co., LTD.

Thrust-through force

Samples with a diameter of 12.7 mm (½ inch) were thrusted with a cylinder with a diameter of 2 mm at a speed of 20 mm/min by using Tensilon/UTM-100 of Kabushiki Kaisha Toyo Boldwin. The force required to thrust through the samples was measured at 20° C. and RH of 65 %.

Elongation at break

The method was similar to that of Example 1.

50% Modulus force 50 % Modulus force is a force required to extend the sample by 50 % of the initial length. The measurement was done by the method similar to that of the thrust-through force measurement.

Water content

The method was similar to that of Example 1.

Oxygen permeability

The method was similar to that of Example 1.

EXAMPLE 3

A PVA gel sample for scanning electron-microscopy was prepared by the same procedure as described for Experimental No. 2. The gel surface was observed by scanning electronmicroscopy after critical-point drying of the hydrated gel. It was found that the gel had long and narrow pores with a size of not more than 3 μm, distributed densely and homogeneously.

TABLE 2

| Experimental No. | Tensile Strength at Break (kg/cm$^2$) | Elongation at Break (%) | Water Content (% by weight) | Visible Light Transmittance (%) | Oxygen Permeability* |
|---|---|---|---|---|---|
| 1 | 24 | 205 | 79 | 99 | 41 |
| 2 | 32 | 487 | 74 | 99 | 32 |
| 3 | 16 | 192 | 87 | 99 | 53 |
| 4 | 27 | 394 | 83 | 98 | 50 |
| 5 | 13 | 176 | 88 | 95 | 54 |
| 6 | 21 | 211 | 82 | 95 | 47 |
| 7 | 19 | 188 | 84 | 97 | 49 |
| 8 | 20 | 237 | 76 | 96 | 38 |
| Comparative Experimental No. | | | | | |
| 1 | 22 | 218 | 84 | 68 | 41 |
| 2 | 15 | 185 | 82 | 61 | 36 |
| 3 | 9 | 140 | 37 | 98 | 9 |

*($\times 10^{-11}$ cm$^3$ · (STP) · cm/cm$^2$ · sec · mmHg)

EXAMPLE 2

To increase the mechanical strength and the Young's modulus of the soft contact lens fabricated in Example 1, the SCL of Experimental No. 2 was subjected to irradiation in nitrogen with electron beams. The results are shown in Table 3.

The PVA soft contact lens of the present invention exhibit a high tensile strength, high water content, and besides, excellent oxygen permeability. Therefore, these lenses can be used for extended wear and intraocular purpose. Moreover, they are applicable as disposable soft contact lens, because they can be fabricated at low cost with a simple casting method.

We claim:

TABLE 3

| PVA SCL used | Radiation Dose (Rad) | Thrust-through Force* (g) | Elongation at Break (%) | 50% Modulus Force (g) | Water Content (% by weight) | Oxygen Permeability** |
|---|---|---|---|---|---|---|
| Experimental No. | | | | | | |
| 2*** | 0 | 110 | 206 | 53 | 84 | 51 |
| 9 | 3 | 140 | 165 | 67 | 81 | 47 |
| 10 | 6 | 194 | 159 | 85 | 79 | 44 |
| 11 | 9 | 220 | 116 | 123 | 77 | 39 |

*calculated at 0.2 mm thick
**($\times 10^{-11}$ cm$^3$ · (STP) · cm/cm$^2$ · sec · mmHg)
***Degree of polymerization of PVA used was 4,800 and the PVA concentration was 5%.

1. A soft contact lens of poly(vinyl alcohol), consisting essentially of microcrystalline poly(vinyl alcohol) crosslinked by irradiation with electron beams or radioactive rays, prepared by crystallizing a poly(vinyl alcohol) at a temperature of not more than 0° C., and having a tensile strength greater than 10kg/cm$^2$, a water content ranging from 40 to 95% by weight, a visible light transparency of not less than 90%, and an oxygen permeability of not less than $30 \times 10^{-11}$ cm$^3$ (STP) cm/cm$^2$ sec mmHg.

2. A soft contact lens according to claim 1, wherein the soft contact lens has pores with a pore size of 1 to 3 μm.

3. A soft contact lens according to claim 1, wherein the crystallized poly(vinyl alcohol) consists of microcrystalline poly(vinyl alcohol) crosslinked in a three-dimensional network.

4. A soft contact lens according to claim 1, wherein the microcrystalline poly(vinyl alcohol) is prepared by crystallizing poly(vinyl alcohol) from a solution having a mixed solvent comprising water and an organic solvent, at a temperature of not more than 0° C.

* * * * *